(12) United States Patent
Myers (10) Patent No.: US 7,043,612 B2
(45) Date of Patent: May 9, 2006

(54) COMPUTE NODE TO MESH INTERFACE FOR HIGHLY SCALABLE PARALLEL PROCESSING SYSTEM AND METHOD OF EXCHANGING DATA

(75) Inventor: Mark Myers, Portland, OR (US)

(73) Assignee: Fujitsu Siemens Computers LLC, Milpitas, CA (US)

( * ) Notice: Subject to any disclaimer, the term of this patent is extended or adjusted under 35 U.S.C. 154(b) by 379 days.

(21) Appl. No.: 10/452,478

(22) Filed: Jun. 2, 2003

(65) Prior Publication Data
US 2004/0044821 A1  Mar. 4, 2004

(30) Foreign Application Priority Data
May 31, 2002  (EP) .................................. 02012101

(51) Int. Cl.
*G06F 12/00* (2006.01)

(52) U.S. Cl. .................. 711/158; 711/141; 711/146; 711/151; 710/40; 710/112; 710/306; 710/244

(58) Field of Classification Search ..................... None
See application file for complete search history.

(56) References Cited

U.S. PATENT DOCUMENTS

| 5,105,424 | A | | 4/1992 | Flaig et al. | |
|---|---|---|---|---|---|
| 5,835,741 | A | * | 11/1998 | Elkhoury et al. | ............ 710/310 |
| 6,148,359 | A | * | 11/2000 | Elkhoury et al. | ............ 710/311 |
| 6,321,307 | B1 | | 11/2001 | Maguire et al. | |
| 6,351,791 | B1 | | 2/2002 | Freerksen et al. | |
| 6,430,646 | B1 | * | 8/2002 | Thusoo et al. | ............... 710/305 |

\* cited by examiner

*Primary Examiner*—Gary Portka
*Assistant Examiner*—Jasmine Song
(74) *Attorney, Agent, or Firm*—Laurence A. Greenberg; Werner H. Stemer; Ralph E. Locher (57) ABSTRACT

An interface circuit for interfacing one or more compute nodes to a mesh and for serving a wide range of MPP systems and a method for exchanging data between a first agent on an expansion bus and a second agent on a system bus through a bus bridge so as to maintain cache coherency with data cached by one or more agents on the system bus. Transaction requests are queued within the bus bridge, transactions are snooped on the system bus, and a record of pending transaction addresses is maintained. Issuance of a queued transaction having the same cache line address as a pending transaction is stalled until the pending transaction has been completed.

9 Claims, 6 Drawing Sheets

COMPUTE NODE TO MESH INTERFACE FOR HIGHLY SCALABLE PARALLEL PROCESSING SYSTEM AND METHOD OF EXCHANGING DATA

BACKGROUND OF THE INVENTION

1. Field of the Invention

The present invention relates to computer interfaces, in particular, to interfaces for interfacing a compute node to a mesh network and to a method of exchanging data.

2. State of the Art

Massively parallel processing (MPP) systems are becoming increasingly widespread. In an MPP system, a large number of "compute nodes" are placed in communications with one another through a "mesh fabric," i.e., a collection of interconnections that typically allows any compute node to communicate with any other compute node. MPP systems have been used to solve computational problems once thought to be uncomputable even using supercomputers. MPP systems are also being applied successfully in the area of high-availability computing.

A prime consideration in relation to MPP systems is the scalability of the system: over what range of computational power can the system be configured to operate successfully. A system that successfully exploits the compute power of 64 compute nodes may prove incapable of successfully exploiting the compute power of 6400 compute nodes. In considering scalability, attention is most often focused on the high end. Often equally important, however, is the low end: what base investment is required to join an MPP performance curve that may span orders of magnitude of compute power.

Low- and moderate-cost computer architectures have increasingly embraced the PCI bus as an expansion bus standard. The PCI bus dramatically increases data throughput as compared to previous generation expansion buses. As compared to a high-speed system bus, however, the PCI bus (and expansion buses in general) remains comparatively slow. Furthermore, a coherency protocol of the PCI bus is not widely implemented. There remains a need for a bus interface, or bus bridge, that allows for high-speed, coherent data transfer between an expansion bus such as the PCI bus and a system bus. A further need exists for a bus bridge that allows for high-speed, coherent data transfer between an interconnection mesh and a system bus. The present invention addresses this need.

SUMMARY OF THE INVENTION

It is accordingly an object of the invention to provide a compute node to mesh interface for highly scalable parallel processing system and a method of exchanging data that overcome the hereinafore-mentioned disadvantages of the heretofore-known devices and methods of this general type and that, generally speaking, provides an interface circuit for interfacing one or more compute nodes to a mesh and that is capable of serving a wide range of MPP systems.

With the foregoing and other objects in view, there is provided, in accordance with the invention, a method of exchanging data between a first agent on an expansion bus and a second agent on a system bus, including the steps of providing a bus bridge bridging the expansion bus and the system bus to maintain coherency with data cached by at least one other agent on the system bus, the bus bridge queuing transaction requests within the bus bridge, snooping transactions on the system bus and maintaining a record of pending transaction addresses, and stalling issuance of a queued transaction having a same cache line address as a pending transaction until the pending transaction has been completed.

With the objects of the invention in view, there is also provided a method of exchanging data, including the steps of providing a first agent on an expansion bus, proving a second agent on a system bus, exchanging data between the first agent and the second agent bus through a bus bridge bridging the expansion bus and the system bus to maintain coherency with data cached by at least one other agent on the system bus, the bus bridge queuing transaction requests therewithin, snooping transactions on the system bus and maintaining a record of pending transaction addresses, and stalling issuance of a queued transaction having a same cache line address as a pending transaction until the pending transaction has been completed.

In accordance with another mode of the invention, there is provided the step of issuing a coherent read shared request on the system bus for a read transaction to an agent on the expansion bus.

In accordance with a further mode of the invention, the expansion bus, the system bus, and an interconnection mesh are bridged with the bus bridge, and there is provided the step of issuing a coherent read shared request on the system bus for a transmit transaction to the interconnection mesh.

In accordance with an added mode of the invention, the bus bridge has a plurality of write gather buffers, for write transactions from an agent on the expansion bus, there are provided the steps of gathering in the write gather buffers data from multiple write transactions pertaining to a cache line, and if the entire cache line is gathered, issuing an invalidate transaction on the system bus followed by a block write of the cache line.

In accordance with an additional mode of the invention, if less than the entire cache line is gathered, there are provided the steps of issuing on the system bus a read modify write transaction for the cache line, merging gather data for the cache line with read data for the cache line, and writing the entire cache line back to memory.

In accordance with yet another mode of the invention, during the read modify write transaction, there are provided the steps of detecting a further request for the cache line, issuing an intervention data response in response to the further request pertaining to the cache line, and if the entire cache line is gathered, issuing an invalidate transaction on the system bus followed by a block write of the cache line.

In accordance with yet a further mode of the invention, there are provided the steps of bridging the expansion bus, the system bus, and an interconnection mesh with the bus bridge, providing the bus bridge with a plurality of write gather buffers, for write transactions from the interconnection mesh, gathering in the write gather buffers data from multiple write transactions pertaining to a cache line, and, if the entire cache line is gathered, issuing an invalidate transaction on the system bus, followed by a block write of the cache line.

In accordance with yet an added mode of the invention, if less than the entire cache line is gathered, there are provided the steps of issuing on the system bus a read modify write transaction for the cache line, merging gather data for the cache line with read-data for the cache line, and writing the entire cache line back to memory.

In accordance with yet an additional mode of the invention, during the read modify write transaction, there are provided the steps of detecting a further request for the cache line and issuing an intervention data response in response to the further request.

In accordance with one embodiment of the invention, the interface circuit implements a method of exchanging data between a first agent on an expansion bus and a second agent on a system bus through a bus bridge so as to maintain cache coherency with data cached by one or more agents on the system bus. The method is performed by queuing transaction requests within the bus bridge, snooping transactions on the system bus, maintaining a record of pending transaction addresses, and stalling issuance of a queued transaction having a same cache line address as a pending transaction until the pending transaction has been completed.

With the objects of the invention in view, there is also provided a bus bridge, including a first interface for interfacing to an expansion bus, a second interface for interfacing to a system bus, queues for queuing transaction requests within the bus bridge, means for snooping transactions on the system bus and maintaining a record of pending transaction addresses, and means for stalling issuance of a queued transaction request having a same cache line address as a pending transaction until the transaction has been completed.

In accordance with again another feature of the invention, the second interface issues a coherent read shared request on the system bus for a first class of transactions.

In accordance with again a further feature of the invention, there is provided a third interface for interfacing to an interconnection mesh.

In accordance with again an added feature of the invention, the first class of transactions includes at least one read transaction to an agent on the expansion bus and a transmit transaction to the interconnection mesh.

In accordance with again an additional feature of the invention, there are provided a cache line, a plurality of write gather buffers, a coordinating device or means for gathering in the write gather buffers data from multiple write transactions from an agent on the expansion bus pertaining to the cache line, and a transaction communicator or means for issuing an invalidate transaction on the system bus followed by a block write of the cache line if an entirety of the cache line is gathered.

In accordance with still another feature of the invention, there is provided a communicating device or means for issuing, if less than an entirety of the cache line is gathered, on the system bus a read modify write transaction for the cache line, merging gather data for the cache line with read data for the cache line, and writing and entirety of the cache line back to memory.

In accordance with still a further feature of the invention, there is provided a transceiver device or means for detecting a further request for the cache line and for issuing an intervention data response in response to the further request.

With the objects of the invention in view, there is also provided a bus bridge, including a first interface for interfacing to an expansion bus, a second interface for interfacing to a system bus, queues for queuing transaction requests within the bus bridge, a snooping device adapted to monitor transactions on the system bus, the snooping device maintaining a record of pending transaction addresses, and a delay device stalling issuance of a queued transaction request having a same cache line address as a pending transaction until the transaction has been completed.

Other features that are considered as characteristic for the invention are set forth in the appended claims.

Although the invention is illustrated and described herein as embodied in a compute node to mesh interface for highly scalable parallel processing system and a method of exchanging data, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

In the present detailed description, the following definitions are used:

Mesh network—a network that routes messages between nodes. The network can be in the form of a mesh, a torus, or another routing connection.

Fabric—another name for the routing network that routes messages between nodes.

Mesh interface—logic between a first bus (e.g., avalanche bus) logic and a second bus (e.g., PCI bus) logic and the fabric.

Torus router interface—logic taken from a torus router (TROUT) and used in the present mesh interface circuit, or mesh interface adapter (MIA), to interface between the TROUT and the MIA. The TROUT and the MIA may both take the form of ASICs.

Mesh channel—name of a remote channel that may be used to interface different MPP systems.

EDC—Error detection and correction.

The present mesh interface adapter (MIA) is configured for use in a mesh MPP system to provide an interface between a first bus (e.g., the avalanche bus), a second bus (e.g., the PCI bus), and the mesh fabric.

Figure 1:
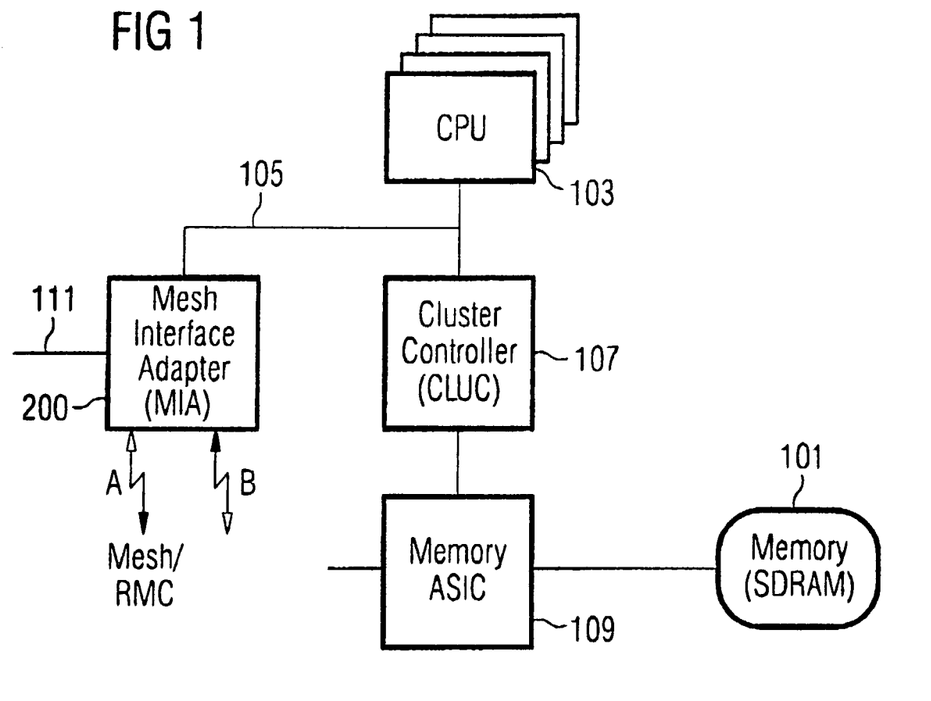
FIG. 1 is a block circuit diagram of a node of a high-end MPP system in which the interface circuit according to the invention may be used.

The MIA can be used in two configurations. Referring now to the figures of the drawings in detail and first, particularly to FIG. 1 thereof, there is shown, in a high end (HE) configuration, both memory 101 and one or more CPUs 103 reside (in relation to an MIA 200) on a bus 105. The bus 105 may be, for example, the avalanche bus used in conjunction with the MIPS R10000 processor. A cluster controller (CLUC) ASIC 107 acts as the avalanche bus cluster controller and, along with a memory controller ASIC 109, provides accesses to and from a memory array 101, such as an SDRAM memory array. The MIA 200 is controlled through the bus 105, to and from which all mesh traffic flows exclusively. The MIA 200 also allows the transfer of I/O data between the bus 105 and a bus 111, but no mesh traffic is directed at the bus 111. The bus 111 may be the PCI bus, for example.

Figure 2:
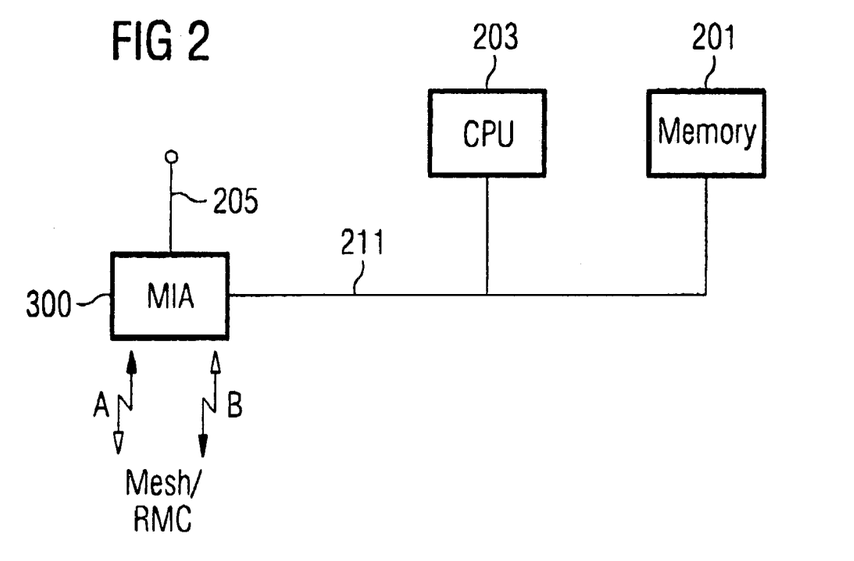
FIG. 2 is a block circuit diagram of a node of a low-end (mid-range compute power) MPP system in which the interface circuit according to the invention may be used.

Referring to FIG. 2, in a mid-range (MR) configuration both CPUs and memory reside on the bus 211. The mesh interface of the MIA 300 is controlled through the bus 211, to and from which all mesh traffic flows exclusively. In the MR configuration, the bus 205 interface is unconnected/inactive.

The MIA 300 provides two independent but identical mesh channel connections. A mesh channel connection includes a transmit (Tx) and receive (Rx) pair. The two mesh channels are designated in FIG. 1 and FIG. 2 as channels A and B. Each mesh channel is configured to directly connect with a processor port interface of a non-illustrated TROUT ASIC. The TROUT ASIC may have a similar architecture as described in U.S. Pat. No. 5,105,424 to Flaig et al., which is incorporated herein by reference. In an exemplary embodiment, each transmit and receive interface has 20-bits (16-bits of data, 2 parity bits, one control bit and one clock).

Each interface of the MIA may be clocked independently, causing the MIA to have potentially five distinct asynchronous clock boundaries. The five asynchronous boundaries are:
1. Bus 105;
2. Bus 111;
3. Mesh transmit, both channels A and B;
4. Mesh receive channel A; and
5. Mesh receive channel B.

Dual port RAM arrays may be used to act as the asynchronous boundary between different clock domains. To do so, data is written into the RAM at one frequency and read from the RAM at a different frequency. Synchronized handshake control signals are, preferably, used to inform the receiving control block that an entry has been written into the RAM, while the sending control block is informed when the entry has been removed from the RAM. In an exemplary embodiment, the MIA registers all incoming signals immediately after the input buffer while all output signals are registered before being driven out.

To facilitate access, all internal MIA registers may be located in the PCI bus clock domain. This allows all register accesses to be identical for each clock domain and prevents the register from having to also be dual ported. These registers come up in a default state but are typically initialized by software before any operations begins through the MIA.

Figure 3:
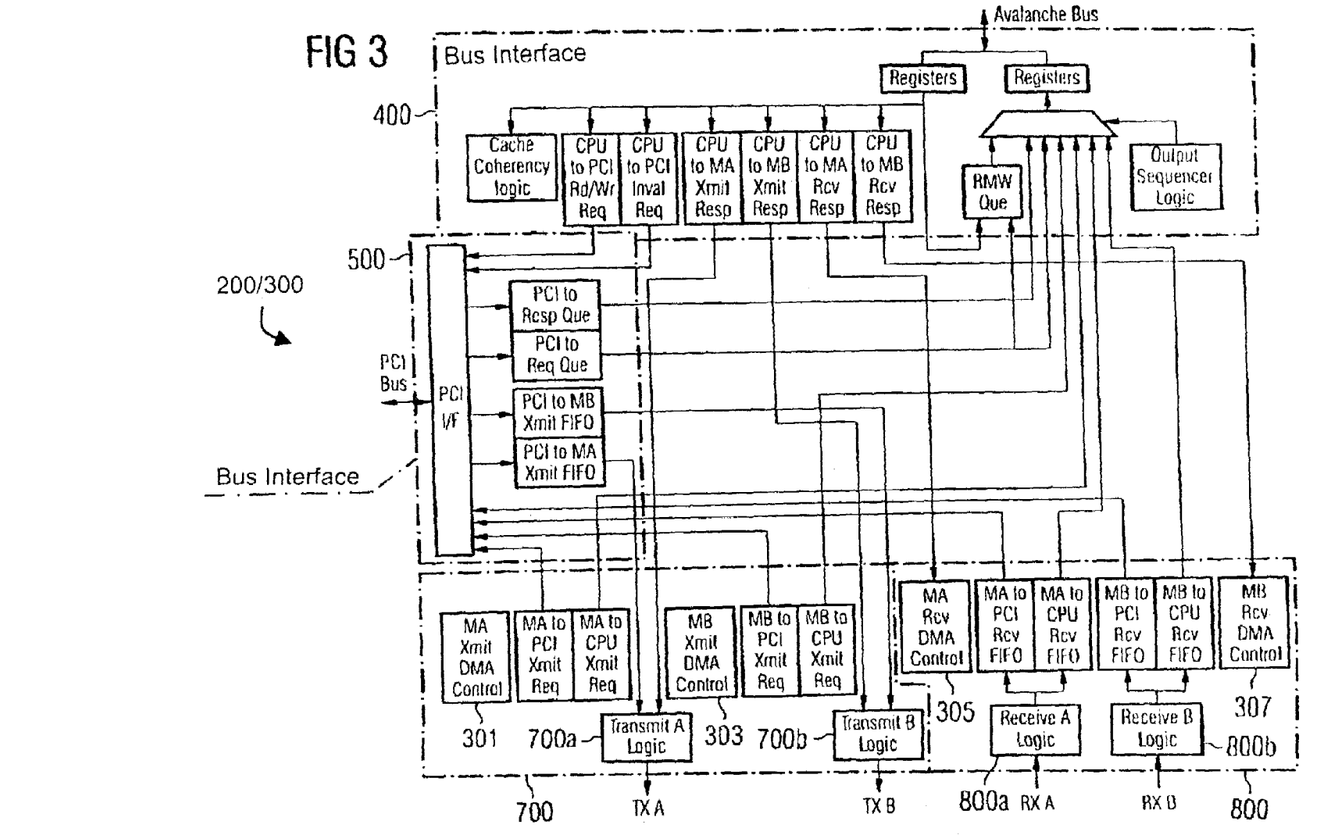
FIG. 3 is a block circuit diagram of the interface circuit of FIGS. 1 and 2.

Referring to FIG. 3, a block diagram of the MIA 200, 300 is shown. The MIA 200, 300 includes a first bus interface portion 400 for interfacing to a first bus such as the avalanche bus, a second bus interface portion 500 for interfacing to a second bus such as the PCI bus, and a third interface portion including a transmit portion 700 and a receive portion 800 for interfacing to the mesh, together with interconnections between the various interface portions. Each of the interface portions will be described in greater detail hereinafter.

Figure 4:
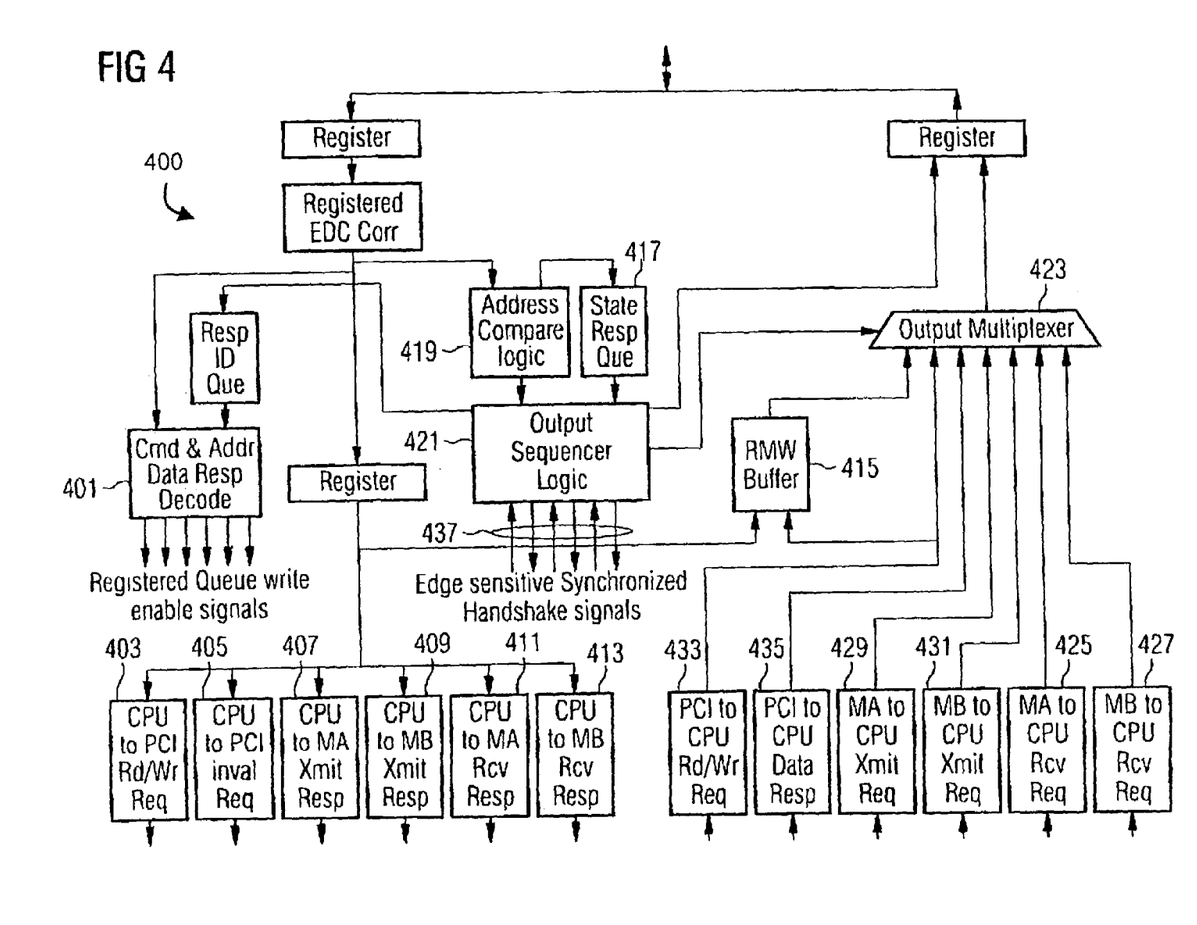
FIG. 4 is a block circuit diagram of a first bus interface of FIG. 3.

The MIA's bus interface 400 allows it to act like a CPU on the bus. In particular, the bus interface 400 allows the MIA to act like a CPU on a cluster bus, a predecessor of the avalanche bus. In this instance, the CLUC ASIC provides all the necessary cluster bus external agent functions of arbitration, response bus control, and monitoring of separate state buses for each of multiple CPUs. In an exemplary embodiment, the MIA issues memory read and write requests and follows the full avalanche bus protocol for:
1. arbitration requests/grants using the sys_req_n and sys_gnt_n signal;
2. flow control of requests using the sys_rd_rdy_n and sys_wr_rdy_n lines;
3. command encodings of data transfers using the sys_ad, sys_cmd, and sys_resp buses; and
4. coherency responses for coherent reads using the sys_state bus.

Further in an exemplary embodiment, the MIA maintains hardware cache coherency with multiple CPUs on all avalanche bus accesses. This allows all I/O accesses to be cache coherent without forcing software to do a cache flush operation. Both 64 byte and 129 byte cache lines are supported. Coherency is accomplished in this embodiment by:
1. issuing a cache invalidate followed by a block write request for both PCI and mesh block write requests;
2. for PCI write requests to memory less than a full block, performing an MIA read-modify-write (RMW) operation. If an MIA RMW operation conflicts with a coherent read on the avalanche bus, the MIA responds with a dirty exclusive state indication followed by an intervention data response; and
3. providing from the MIA to the CLUC coherent state indications for all CPU coherent read requests and upgrades through its sys_state bus signals. For each of four PCI read prefetch buffers, the avalanche bus is snooped causing the pre-fetched data to be invalidated if the cache fine is accessed by a CPU.

Figure 5:
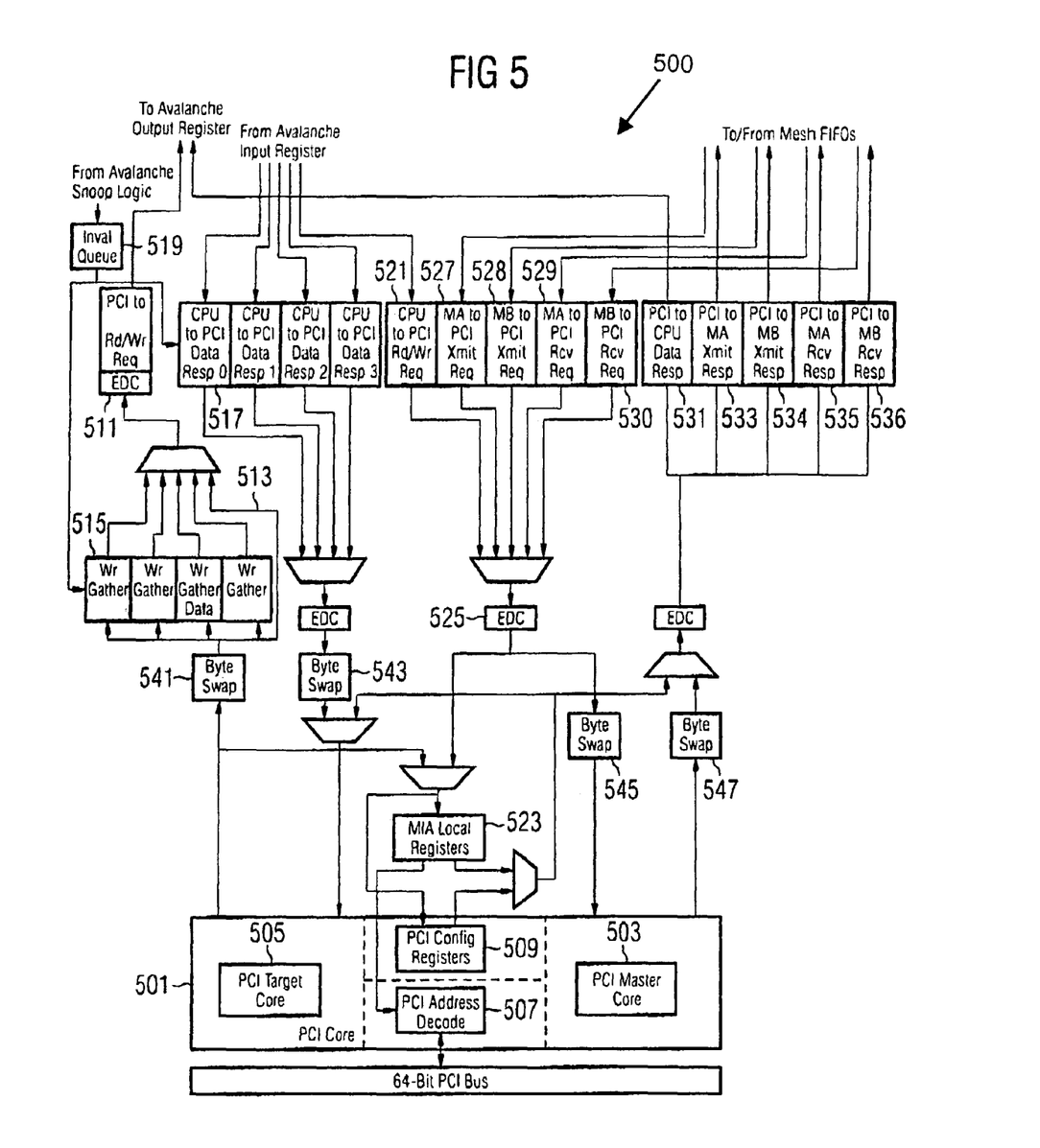
FIG. 5 is a block circuit diagram of a second bus interface of FIG. 3.

In an exemplary embodiment, the bus interface 500 is a PCI interface. The PCI interface 500 includes the logic necessary to be either a master or a slave on the PCI bus. It is used to interface to other PCI controllers such as SCSI, Ethernet, etc. The PCI interface supports either 32-bit or 64-bit data transfers. The interface control is configured to allow high data throughput.

High PCI bus bandwidth is achieved by using multiple read prefetch buffers. These buffers read more data than requested by an I/O agent. When the last block of data requested by an I/O agent has been pre-fetched, the next data block is pre-fetched from memory in anticipation of the VO agent's read request for the next sequential block of data. The MIA also contains four write gather queues. The write gather engines attempt to capture sequential PCI write requests and issue a single block write on the avalanche bus instead of multiple partial write requests. The write gather buffers use a least recently used (LRU) algorithm to determine which write gather buffer is next to be flushed when more than four separate writes are active on the PCI bus.

The MIA does not provide arbitration for the PCI bus (an external arbiter must provide this function).

Figure 7:
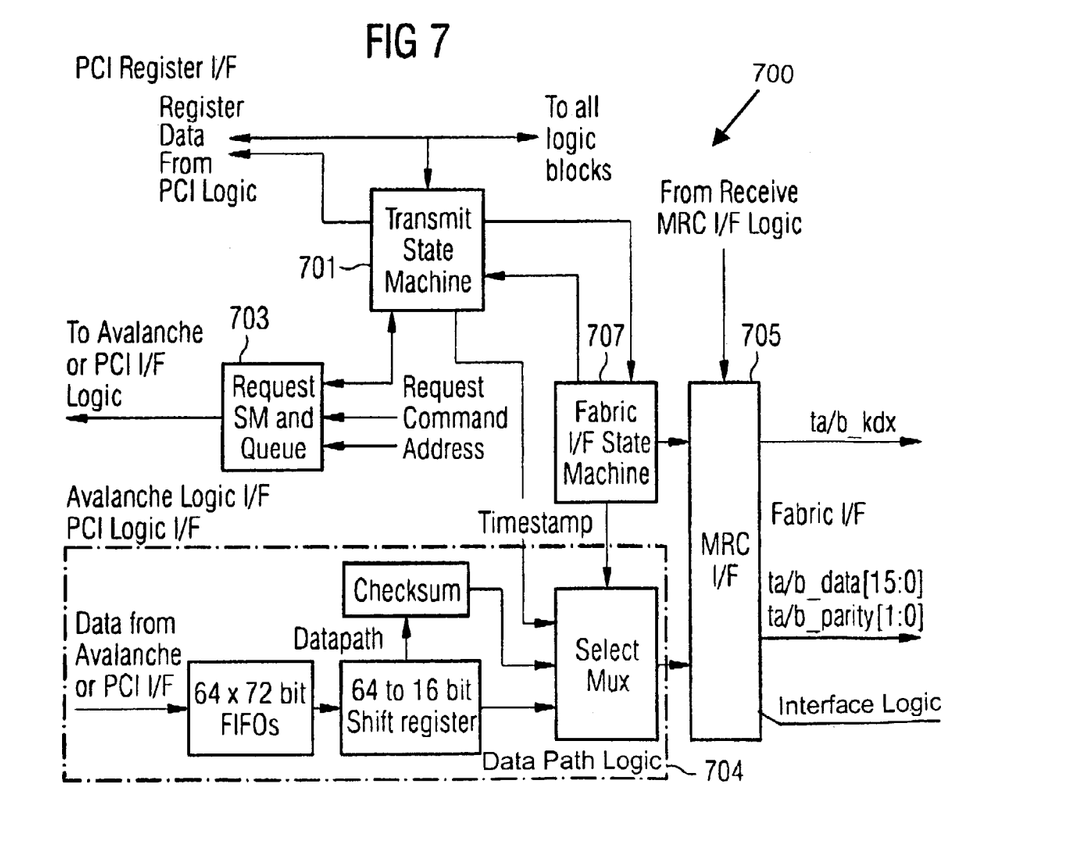
FIG. 7 is a block circuit diagram of the transmit logic of FIG. 3.
Figure 8:
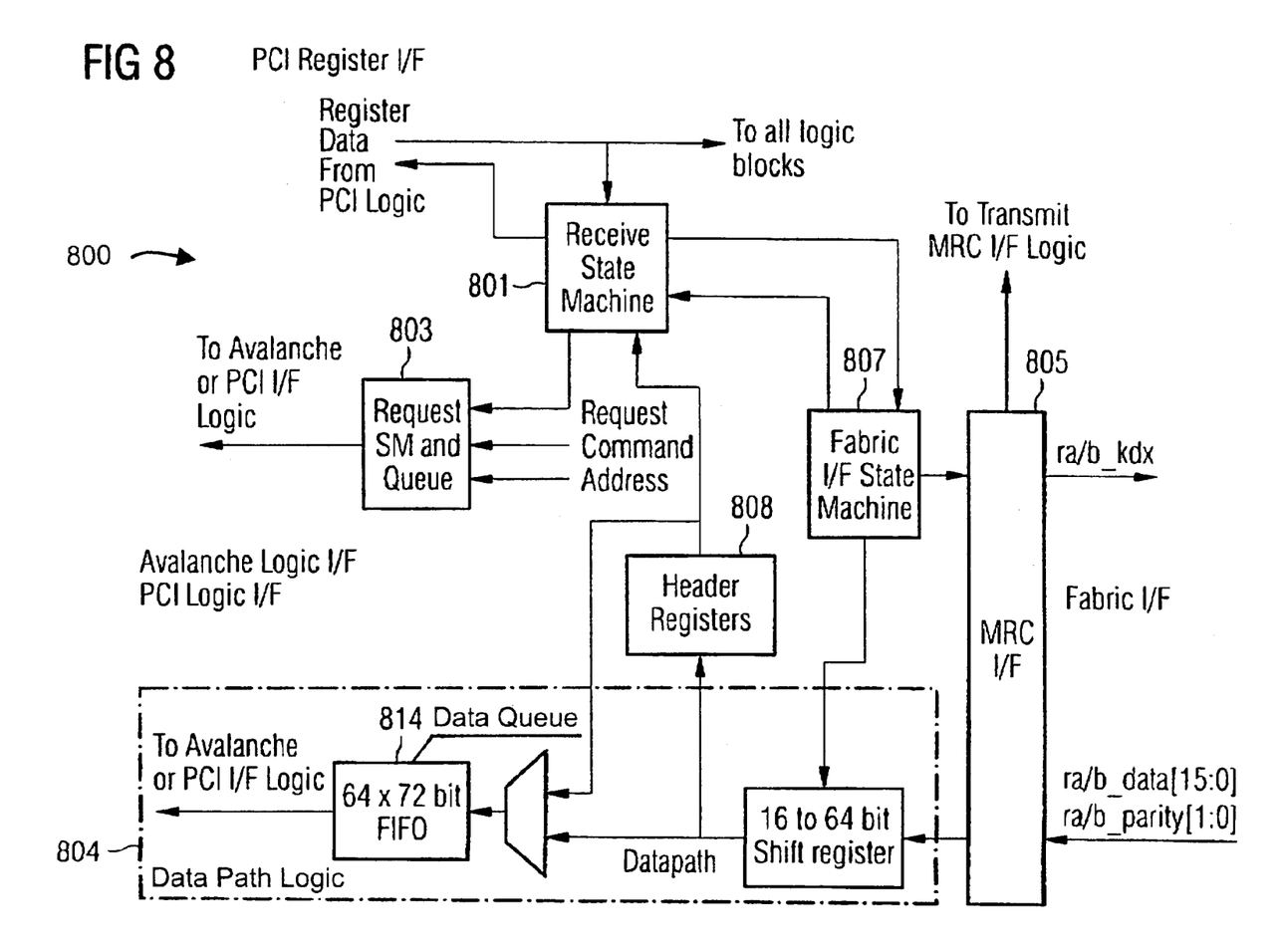
FIG. 8 is a block and schematic circuit diagram of the receive logic of FIG. 3.

The MIA mesh interface logic (700,800) allows the MIA to send and receive messages over the mesh fabric. The mesh interface logic has two separate receive ports and two separate transmit ports used to connect to two separate fabrics. The two fabrics can either be a primary fabric with a redundant backup, or they can both be primary fabrics sharing the load. All four ports have separate logic and can operate simultaneously.

In an exemplary embodiment, the mesh interface logic has 16 bit wide data paths. The two transmit interfaces are driven by the same clock, whereas the receive interfaces are driven by separate input clocks coming from their transmit sources.

The MIA mesh hardware ports can be used to interface to a remote mesh channel (RMC) or a fiber mesh channel (FMC). The connection to a RMC is done by adding drivers and receivers to the existing mesh port signals. The connection to the FMC requires external logic that converts the mesh protocol to the fiber channel protocol.

Referring to FIG. 4, a block diagram of the bus interface logic 400 is shown in greater detail. The interface logic has the following principal blocks:

1. input address/command decode (401);
2. input/output queues (403, 405, 407, 409, 411, 413; 425, 427, 429, 430, 433, 435);
3. state response queue (417);
4. address comparison block (419);
5. output data multiplexer (423); and
6. output sequencer control block (421)

The input address/command decode block 401 is responsible for routing all avalanche bus accesses that target the MIA to the proper destination inside the MIA. This block's main job is to decode the sys_cmd and sys_ad buses to determine the type of access targeting the MIA. For avalanche partial requests that target the PCI bus, the MIA contains three (32-bit) base/size registers that are initialized at power-on with the proper information that the MIA uses to determine if a read/write request is accessing the MIA. This block also keeps track of the read requests issued by the MIA that are pending response on the avalanche bus. MIA data responses use the request number to route the data to its proper destination queue. There are eight input queues that receive incoming request/responses from the avalanche bus. These queues are:

1. CPU to PCI read/write request address/data, queues (403). These queues are written with incoming PCI and MIA register partial read and write requests. There is a separate queue for both address and data;
2. CPU to PCI invalidate request queue (405). This queue is written with incoming avalanche bus read, write, and upgrade requests;
3. CPU to mesh A transmit data response queue (407). This queue is written with the block data responses from memory requested by the mesh A channel transmit DMA controller (301 in FIG. 3);
4. CPU to mesh B transmit data response queue (409). This queue is written with the block data responses from memory requested by the mesh B channel transmit DMA controller (303 in FIG. 3);
5. CPU to mesh A receive data response queue (411). This queue is written with the partial data response from memory issued by the mesh A channel receiver DMA controller (305 in FIG. 3);
6. CPU to mesh B channel receive data response queue (413). This queue is written with the partial data response from memory issued by the mesh B channel receiver DMA controller (307 in FIG. 3);
7. RMW data response queue (415). This queue is written with the exclusive block data response caused by the flashing of an incomplete block of data from one of the PCI write gather queues (FIG. 5); and
8. State response queue (417). This queue is written by the address compare block 419 whenever a coherent read request or upgrade is issued by a CPU on the avalanche bus. The address compare block indicates that a dirty exclusive state response must be issued on the MIA's sys_state bus if the incoming coherent read request matches the address that the MIA is in the process of.

The address compare block 419 is responsible for snooping avalanche bus request cycles (including partial accesses). Incoming coherent request addresses are stored when they are issued on the bus and remain valid until the coherent request receives a completion response on the sys_resp bus. The output sequencer 421 uses the address compare block 419 to determine if it is able to issue a coherent request on the avalanche bus. The MIA stalls any coherent read request whose address compares with a CPU coherent request address that is pending response. The address compare block 419 also: (1) stores the MIA's RMW address to determine if the MIA must intervene on a CPU coherent read request; and (2) keeps track of the available request numbers that can be used. A request number is allocated whenever a read/upgrade request is issued. The request number is available for use when the request number receives a completion response on the sys_resp bus.

The output sequencer 421 controls the output data multiplexer 423. The output sequencer 421 uses the multiplexer 423 to select between one of five possible address sources and one of six possible data sources to drive onto the avalanche bus. The five address sources are:

1. Mesh A receive address queue (425);
2. Mesh B receive address queue (427);
3. Mesh A transmit read request address queue (429);
4. Mesh B transmit read request address queue (431); and
5. PCI bus read/write request address queue (433).

The six data sources are:

1. Mesh A receive request data queue (425);
2. Mesh B receive request data queue (427);
3. PCI bus data response queue (435);
4. PCI bus data request queue (433);
5. Read-modify-write (RMW) queue (415); and
6. Interrupt data register.

The output sequencer block 421 monitors the availability of any pending response/request. It generates the proper avalanche bus commands on the sys_cmd bus and selects the proper address/data sources to send onto the avalanche bus. Because the queues act as the asynchronous boundary between each of the MIA clock domains, an edge sensitive handshake protocol is required to determine when a response/request is pending. Handshake protocol signals 437 are asserted by the writing control block and synchronized (double registered) in the receiving clock domain. When a reading control block has finished popping an access off a queue, the same handshake protocol is used to inform the writing control block that another transaction can be written into the queue.

The output sequencer 421 uses a round-robin protocol to determine if any of the queues are not empty. When a queue is not empty, the output sequencer 421 reads the command, if it is a request queue, and issues the request on the avalanche bus according to avalanche bus protocol. If the request is a read request, the output sequencer 421 saves the request number in a buffer so that it can send the response data to the proper destination queue. If the request is a write request, the output sequencer 421 issues the address followed by the corresponding data cycle(s).

If the queue is a response queue, the output sequencer 421 issues the data response using the avalanche bus intervention data response protocol that requires the MIA to assert sys_state[O] simultaneously with its arbitration request. This protocol allows the CLUC to give priority of arbitration requests to data responses.

The output sequencer 421 can also issue interrupts to the CPUs using the avalanche bus. If an error in any one of the clock domains occurs, the output sequencer 421 issues an interrupt to the CPU. The CPU, then, reads the error status from the MIA.

Bus Coherency Mechanisms

The MIA issues coherent read shared requests for both mesh transmit and PCI bus accesses to memory. For mesh receive and PCI bus block write requests, the MIA issues an invalidate for the cache line followed by the block write access.

For write requests less than a complete cache line, the MIA performs an RMW access.

Using the state response queue 417, the MIA issues state responses for CPU coherent accesses in FIFO order. Because PCI and mesh read accesses are issued as coherent read shared requests, the MIA responds with an invalid state indication on the sys-state lines and issues an invalidate request for the cache line to the PCI read prefetch buffers (FIG. 5). Even though cache lines are read using the read shared command, the MIA does not keep track of which addresses in the PCI read prefetch buffers are valid.

The PCI bus interface logic has four read prefetch buffers 517 that prefetch data not yet requested by an I/O agent. This data prefetch mechanism allows the MIA to sustain a high data transfer rate on the PCI bus. If a CPU accesses the same data contained in any of the four PCI read prefetch buffers, then the data in the buffer is thrown away (invalidated) and a new read of memory is issued on the next I/O agent request.

The avalanche bus coherency protocol requires that there is only one outstanding coherent request for any given cache line at a time. This function is provided by the address compare logic 419 that stalls the MIA's output sequencer 421 from issuing a coherent request (upgrade or block read) of a cache line for which a processor request is pending response. A processor request is considered a pending response after it has been issued on the avalanche bus but has not yet received an external data or completion response.

The last MIA coherency mechanism allows the MIA to issue an intervention data response if a coherent processor request accesses a cache line for which the MIA is in the process of an RMW access. The MIA contains four PCI bus write gather queues (FIG. 5) whose function is to collect sequential partial write accesses. If the PCI write gather block collects a complete cache line of data, then the MIA issues an invalidate request immediately followed by a block write access. However, when a write gather buffer is unable to gather a complete cache line before it is flushed, the MIA performs an RMW operation by issuing a read exclusive request and merging the block response data with the partial block and, then, writing the merged cache line back to memory. If an MIA RMW access is active and a coherent read request for the same cache line is detected, after the response data has been received from memory but before the merged cache line can be written back out to memory, the MIA issues a dirty exclusive state indication on the sys_state lines and, then, issues the merged cache line as an intervention data response. If no CPU coherent read request hits the cache line for an MIA RMW access then the MIA issues a block write request. The RMW operation is the only case for which the MIA issues a dirty exclusive state indication on the sys_state lines. The MIA may only have one RMW access active at a time.

Multiple Usage Models

Referring to FIG. 5, the PCI interface 500 contains the logic necessary to transfer data between the PCI interface and either the mesh or avalanche buses. The PCI interface 500 is configured such that it assumes one of multiple usage models as follows:

1. main memory resides on the avalanche bus; and
2. main memory resides on the PCI bus When main memory resides on the avalanche bus, all memory requests that originate from the PCI bus will be directed to the avalanche bus. This usage model also assumes that no requests to the PCI bus will originate from the mesh interface. When main memory is resident on the PCI bus, memory requests originating from the PCI bus will be accepted if they fall within the PCI base/size configuration register and are directed to the MIA register core. Requests from either the avalanche bus or mesh interface will be serviced with data returned to the respective queue. When main memory resides on the PCI bus, it is assumed that a CPU node exists there as well. In the latter configuration, it is further assumed that MIA register accesses will originate from the PCI bus. The data traverses through a PCI target core as will be presently explained.

In an exemplary embodiment, the PCI interface 500 supports a 64-bit data path and may be implemented using a synthesizable core 501 configured by virtual chips. The PCI core 501 includes a PCI master core 503, a PCI target core 505, a PCI address decode block 507, and PCI configuration registers 509.

The PCI core 501 interfaces to logic that manages various request, address, and data queues between the PCI bus and the avalanche and mesh buses. A PCI to CPU read/write request queue 511 receives memory requests from the PCI bus and directs the request to the avalanche bus. This is an asynchronous queue that is written at the PCI bus frequency and is read at the avalanche bus frequency. The input to this queue can be either directly from the PCI bus (read requests through path 513) or from one of four independent write gather buffers 515 (explained hereinafter). The CPU read/write request queue 511 is, preferably, at least one cache line deep and 72-bits wide (data and EDC). Each memory read request from the PCI bus causes a block (cache-line) prefetch. Once a valid request is in the PCI to CPU request queue 511, the avalanche interface is notified through an asynchronous handshake to transmit the request to the avalanche bus.

The PCI to CPU request queue 511 may require a read modify write (RMW) sequence to be performed on the avalanche bus. This occurs when a partially written write gather buffer 515 requires "flushing" to memory. To support this capability, data from the specified write gather buffer is 515 tagged with byte enables to allow an RMW state machine to merge in the correct bytes with the data from memory. RMW is only performed on cache line boundaries.

In an exemplary embodiment, the write gather buffers 515 are 72-bits wide (64-bit data and 8-bits of byte enables) by 256 bytes deep and are used to buffer write data destined for avalanche memory from the PCI bus. The write gather buffers 515 assemble data into block sizes equal to the cache line size (control register selectable up to 256 bytes). PCI controllers may not be able to supply a cache lines worth of data within a PCI bus operation, and therefore, the write gather buffers 515 are used to assemble these smaller blocks into a cache line. This is done to reduce the number of partial accesses that would be required if these buffers were not available. In an exemplary embodiment, there are four write gather buffers 515 available, allowing for up to four active PCI memory write requests. The write gather buffers 515 can be "flushed" to the avalanche bus by several mechanisms including:

write gather buffer is full—a block has been assembled and is ready for transfer to memory. This is detected when all byte enables for the cache line are active;

the snooping logic of the avalanche bus detects an invalidate to an active write gather buffer;

time based flushing, which is used to guarantee that data does not become stale in the write gather buffer;

least recently used (LRU). Used when all four write gather buffers are active and a fifth write request is detected on the PCI bus;

PCI read address compares to write gather buffer. In this case, PCI requires flushing to guarantee that the write precedes the read;

forced flush by software through MIA control register access; and pending PCI interrupt. The write gather buffers are flushed before the interrupt is allowed to propagate to the avalanche bus.

After valid read requests have propagated through the PCI to CPU read/write request queue 511, data is returned to one of four CPU data response buffers 517 (at avalanche bus clock frequency). The specific data response buffer is determined at the time that the read request is issued to the avalanche output sequencer 421 and is specified in the upper bits of the address. In an exemplary embodiment, the response buffers 517 are each 72 bits wide (data and EDC) and support a cache line size up to 256 bytes.

Snooping logic is provided to compare memory request addresses received from the PCI bus to determine whether or not the data resides within one of the CPU data response buffers from a previous read request. If the data has been pre-fetched, the request does not propagate to the avalanche bus and data is returned to the PCI bus from the prefetch buffer.

There are several mechanisms whereby a CPU response buffer can be marked invalid within an invalid queue 519. These mechanisms include:

least recently used (LRU). Used when all four data response buffers 517 have valid data and a fifth request that requires read response data is accepted and directed to the avalanche output sequencer 421;

address invalidated by snooping logic of avalanche bus that indicates an agent on the avalanche bus contains newer data than in the data response buffer 517;

time based invalidation, which is used to force a response buffer to request potentially new data from an avalanche bus agent;

software forced invalidate through MIA control register access; and pending PCI interrupt. Any read response data buffer with valid data is marked invalid at detection of any PCI interrupt, forcing the fetching of new data from avalanche memory for requests subsequent to the PCI interrupt.

A CPU to PCI read/write request queue 521 receives requests from the avalanche bus and directs the request to the PCI bus. Additionally, this path is used to access local registers 523 of the MIA. This is a single queue for requests, which forces serialization of the requests from the avalanche bus. Data flows through an EDC checker 525 at the output of the PCI request queue before being written to either the PCI master core 503 or the MIA register space 523.

The PCI master core 503 is signaled of a valid request and subsequently sequences the request to the PCI bus. Because PCI bus operations are connected (single-envelope) transactions (as opposed to split-bus avalanche transactions), no more requests are removed from the PCI request queue until the current PCI request has completed.

A command field and request number generated by an avalanche input sequencer flow with the address through the CPU to PCI read/write request queue 521. This information is merged in the upper reserved bits of the address. During EDC checking of the address, the bits for which the command and request number are merged are cleared before input to the EDC checker. On read requests, these bits are returned with the response data to the avalanche bus output sequencer 421. The command field is modified to reflect error conditions (such as parity error or bus time-out) encountered during the PCI bus transaction.

The mesh transmit/receive request queues (527, 528, 529, 530) receive requests from the mesh interface and direct those requests to the PCI bus. A PCI master state machine performs fair arbitration among the four request queues (527, 528, 529, 530) when more than one has a pending access to the PCI bus. Since PCI bus operations are connected transactions, the appropriate data response queue is enabled once a request queue has been selected.

The PCI master core 503 is signaled of a valid request and, subsequently, sequences the request to the PCI bug. Because is PCI bus operations are connected transactions, no more requests are removed from the PCI request queue until the current PCI request has completed.

The PCI master core 503 is capable of generating dual address cycles (DACs) on the PCI bus but assumes at most a 40-bit address field. If the upper byte (bits[39:32]) is zero, the PCI master core 503 will automatically issue a single address cycle, regardless of the MIA control register that controls DAC generation. For those devices that cannot generate dual address cycles (or an address larger than 32-bits), the MIA target core provides a base address to extend the address to 40-bits when propagating the data to the avalanche bus.

The PCI to CPU data response queue 531 buffers response data between the PCI bus or MIA registers and the avalanche bus. Active PCI requests initiated by the PCI master state machine will return data through the PCI master core 503 at PCI bus speeds and transfer the data into the PCI to CPU data response queue 531. Once valid data is resident in the PCI to CPU data response queue 531, the output sequencer 421 is signaled (through synchronized edge detected handshake signals 437). In an exemplary embodiment, the PCI to CPU data response queue 531 is 72-bits wide (data and EDC) and eight quad words deep.

In addition to data, the avalanche command field and request number is output to the avalanche output sequencer 421.

The PCI to Mesh transmit/receive response queues (533, 534, 535, 536) buffer response data between the PCI bus and the mesh interface 700. Active PCI read requests initiated by the mesh control logic will return data through the PCI master core 503 at PCI bus speeds and transfer data into the respective mesh data response queue. The mesh interface control logic is signaled of valid data (through synchronized edge detected handshake signals 437) at the completion of the transfer of the requested data to the respective data response queue.

The mesh interface control logic is configured to only request cache-line sized blocks.

The invalidate queue 519 is written by the avalanche bus interface logic. Avalanche bus addresses are compared with the active addresses of both the write gather and data response queues to signal when to invalidate any of the queues. Invalidates to active write gather queues cause the queue to be flushed to memory whether the queue is full or not. Invalidates to read response data queues simply mark the data as invalid and subsequent requests to the invalidated cache line through the PCI bus cause a new request/fetch of data from memory.

The PCI address decode block 507 is part of the PCI core 501 and provides address recognition and mapping logic. It receives inputs from the MIA register block 523, specifically, PCI memory hole 1 and PCI memory hole 2 registers. These two registers are used when the MIA has been configured in HE mode to specify addresses originating from the PCI bus that will be ignored by the MIA (allowing software to map PCI agents control registers into memory). In MR mode, the PCI address decode block 507 uses a PCI base/size register to determine that addresses to accept from the PCI bus. The PCI base/size register resides in the PCI configuration register block 509.

The PCI target core 505 provides the logic necessary to respond to PCI bus read and write operations. It generates all PCI bus control signals and responds to all control signals received. The PCI target core 505 also generates timing for actions such as transferring data, retrying, aborting, and disconnecting, and provides additional buffering between the PCI bus and the CPU to PCI data response queues 517. This buffering is used for flow control between the PCI core 501 and the MIA core logic and allows for the assembly/disassembly of 64-bit quad words when 32-bit devices are attached to the PCI bus.

Logic between the MIA response data/write gather buffers forms an MIA target core that only accepts PCI memory and configuration operations and forces the PCI target core 505 to target abort any other PCI operations (I/O, special, interrupt acknowledge).

The PCI master core 503 is part of the PCI core 501 and provides logic necessary to generate all PCI bus control signals and respond to all control signals received. The PCI master core 503 generates timing for actions such as issuing PCI requests, aborting, and disconnecting.

Additionally, the PCI master core 503 provides buffering between either the avalanche bus or mesh interfaces and the PCI bus. This buffering allows for the assembly/disassembly of 64-bit quad words when 32-bit devices are attached to the PCI bus. The PCI master core 503 has the capability to issue all standard PCI operations. Within the MIA register block 523, a PCI memory address base register (not to be confused with the base/size register located in the PCI configuration space 509) is used to compare avalanche bus addresses. For partial requests originating from the avalanche bus that fall within the address range as specified, PCI memory read/write operations are performed. Also provided within the MIA register block 523 are a PCI configuration address base register (an avalanche bus address comparison register) and a PCI access command register. To perform other PCI bus operations, partial requests originating from the avalanche bus that fall within the address range as specified by the PCI configuration address base will perform the PCI bus operation as specified in the PCI access command register.

Dynamic Byte Swapping and Register Access

Byte swap blocks 541, 543, 545, and 547 are used to translate endianess of the various interfaces. In particular, whereas the avalanche bus is big endian, the PCI bus is little endian. Byte swapping is performed strictly on quad-word boundaries (8-bytes) and only on data words when enabled through an MIA control register. MIA register accesses (including backend accesses to the PCI configuration registers) originating from the avalanche bus do not pass through the byte swappers.

All MIA software accessible registers reside in the PCI block. Asynchronous handshake signals exist between the avalanche and mesh interfaces to validate any signals or registers that cross interface boundaries.

PCI configuration registers 509 can also be accessed through an avalanche bus request through the register block 523, in addition to access capability through PCI configuration commands on the PCI bus. There is no synchronization between PCI configuration accesses (through PCI bus) and "backend" register accesses to the PCI configuration block 509. MR configurations (memory/processor resident on the PCI bus) use PCI configuration operations to access the configuration registers while HE configurations (memory/processor resident on avalanche bus) access the configuration registers through MIA register accesses.

The PCI configuration registers 509 are part of the PCI core 501. Access to these registers can be either from the PCI bus through PCI configuration operations or from the avalanche bus through MIA register accesses. While the MIA is in HE mode, PCI configuration register access is supported by avalanche bus MIA register access. For MR modes, the PCI configuration registers are accessed through PCI configuration operations.

PCI configuration register accesses originating from the avalanche bus (HE mode) using MIA register access bypass hardware byte swapping logic. Software byte swapping is required for a consistent view of these registers.

In a preferred embodiment, the MIA register block 523 is ordered big endian. Therefore, when the MIA registers 523 are accessed through the PCI bus in little endian mode, software byte swapping is required for proper operation. This allows a consistent view of the PCI configuration registers from the PCI bus, whether they are accessed through PCI configuration operations or PCI memory operations (PCI configuration registers are memory mapped as well).

As described above, the PCI configuration registers are "dual ported," however, no hardware lock mechanism exists to prevent any contention should both ports be accessed concurrently. Contention is avoided by observing the following conventions:

In HE mode, all PCI configuration registers are accessed through normal MIA register access method (PCI configuration registers are memory mapped). Nothing prevents PCI configuration accesses to these registers (even those originating from the MIA) except whether or not the PCI signal IDLE has been connected on the CPU node to allow for this type of access; and In MR mode, all, PCI configuration registers are accessed through PCI configuration operations; however, these registers can also be accessed through memory operations with the PCI protocol preventing concurrent accuses.

Figure 6:
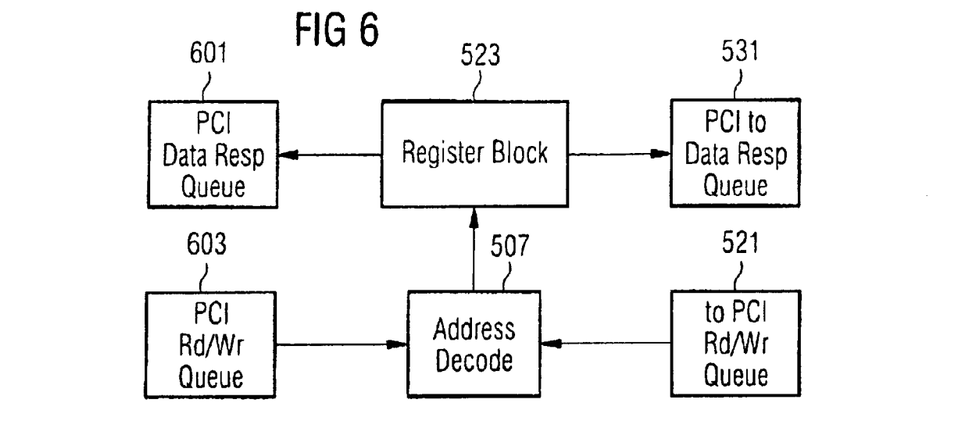
FIG. 6 is block circuit diagram of registers of the interface circuit according to the invention together with access circuitry.

FIG. 6 shows the MIA's register block diagram. Access to registers inside the MIA are through the PCI clock domain. Locating the registers in one clock domain prevents adding register read/write request and register response queues to each clock domain. Because register contents can be written asynchronously from an agent/controller looking at the register outputs, a signal is sent from the PCI register controller indicating whether all register contents are valid or invalid. If the signal is valid, then the registers contents are stable and can be used. The signal only indicates that register contents are invalid when the controller is in the process of modifying a register. Because the register valid signal must also be synchronized, the register controller guarantees that the synchronized valid signal is de-asserted and detected before the actual register contents are modified. FIG. 9 shows the MIA's register block diagram.

Of particular interest in the case of the present invention are the following registers: PCI memory address base register, local register address base register, PCI configuration address base register, and PCI memory address hole register. Mode input signals to the MIA control initialization of these registers at reset. The function of each of these registers is briefly described in Table 1

TABLE 1

| REGISTER | FUNCTION |
|---|---|
| PCI Memory Address Base | This register determines both the address base and size of PCI memory space as seen from the avalanche bus. |
| Local Register Address Base | This register determines both the address base and size of MIA register space as seen from the avalanche bus. |
| PCI Configuration Address Base | This register determines both the address base and size of PCI bus configuration space as seen from the avalanche bus. |
| PCI Memory Address Hole 1 | This register determines both the address base and size of PCT memory address hole. Only used if memory is located off the avalanche bus. |

Usage Models—Summary

The usage model for the HE Mode of the MIA can be summarized as follows:

In HE mode, only partial requests are supported (one quad word or less) and results in PCI Memory Read or PCI Memory Write operations;

In HE mode, PCI configuration operations are supported by initializing the PCI access command register to the 8-bit value of h01 and issuing a partial operation on the avalanche bus that falls within the address range as specified by the PCI configuration address base register;

In HE mode, other PCI operations (PCI I/O, special, etc.) are supported by initializing the PCI access command register (only one bit may be set) appropriately as well as issuing a partial operation on the avalanche bus that falls within the address range as specified by the PCI configuration address base register; and When issuing PCI configuration operations (or any other PCI operation as allowed in the PCI access command register), the address is passed unaltered directly from the avalanche bus, as is the data word (during write operations). Software ensures that the CPU to PCI request queue has completed the PCI bus operation register if a subsequent request is of a different type (i.e., changing from a PCI configuration operation to a PCI I/O operation).

The usage model for the MR mode of the MIA can be simply stated that all requests originating from any of the mesh request queues will result in PCI memory read line or memory write and invalidate bus operations (attempt at bursting a cache line). Partial requests and any non-memory operations are not supported.

Mesh Interface

The mesh interface (700, 800) has two receive and two transmit ports configured to interface to two separate mesh networks. Each of the ports can be connected to a TROUT ASIC, an RMC interface, or a fiber channel interface. The MIA connects directly to the TROUT chip. External logic is required to connect the MIA to the RMC and the fiber channels. Each port supports 16 bit wide data transfers.

The two transmit interfaces 700*a* and 700*b* are controlled by transmit request blocks (TRBs) that define the message type, is supply the mesh network address and message header bytes, and provide pointers to any data bytes in the message. In normal operation, the node uses both mesh networks to balance the load on each network. If a network failure is detected, a node will route around the failed network and use the other network. Each transmits port works independent of the other. In an exemplary embodiment, each transmit interface has a 512 byte FIFO (64 words deep by 72 bits wide) used to store fetched data from memory before the data is sent out on the mesh.

The two receive ports 800*a* and 800*b* operate independently and can receive messages simultaneously. After receiving the header from the network it is analyzed to determine what type of message it is. If there is data with the header, then it is stored into local DRAM as it is received from the fabric. The header and status are, then, stored in memory in receive message blocks (RMBs). In an exemplary embodiment, each receive interface has a 512 byte FIFO used to store incoming data before it is analyzed or stored in memory.

Each transmit port and each receive port interfaces independently with the avalanche bus logic and the PCI interface logic to access local memory by issuing read requests or write requests from the other buses control logic. In an exemplary embodiment, the mesh interface logic can support either a 64 byte or a 128 byte cache line size.

In an exemplary embodiment, there are four types of messages:

Hardware control messages;
Mailbox messages;
DMA write messages; and
Aligned write messages.

Hardware control messages allow nodes on the mesh network to send reset and interrupt commands to other nodes. These messages have a message header and message checksum and do not contain any data bytes. Two hardware message resets—a hard reset and a soft reset—and one hardware message interrupt are supported. This interrupt is a maskable interrupt used to interrupt the processor.

Mailbox messages allow nodes to send unsolicited messages to each other. They are used to send commands to other nodes and send responses when commands are completed. When a node receives a mailbox message, it saves the message in a mailbox buffer in the nodes DRAM memory. Each mailbox message can also cause an optional processor interrupt.

DMA write messages allow a node on the mesh network to write data buffers in another node. This is used to transfer large blocks of data between nodes without having the processor copy the data from the mailbox buffer to the actual data buffer. This would typically be used for things like disk reads and writes. The receiving node controls how DMA writes are done to its memory by using a DMA write protection array (WPA) and DMA write keys. Each DMA write message can also cause an optional processor interrupt.

The aligned message is used to send data without being required to setup the receiving node before transfer. The receiving node has a data buffer in local memory, along with an index register in the MIA pointing to the next location available in local memory (the address is always on a page boundary). When this message is received, the data is sent to the memory buffer address found by the write pointer array (WPA) register base address and the aligned index register. Each aligned message can also cause an optional processor interrupt.

In accordance with an exemplary embodiment, the MIA mesh logic and interface is capable of supporting four different page sizes. Size is initialized at the beginning of operation. The sizes supported are 4 KBytes, 8 KBytes, 16 Kbytes, and 32 KBytes. Any message can have less than a page size of data sent, but the size is assumed to be a multiple of four bytes. For mailbox messages, the size can range from zero bytes to one page of bytes. For DMA and aligned messages the size ranges from four bytes to one page of bytes. For the MIA, a flit is two bytes of data. The MIA transmit and receive channels have the capability to loopback data sent out to the transmit port back to the receive channel without leaving the MIA. This is done by setting a loopback bit in the TROUT portion of the receive channel logic and insuring that there is only one address flit.

The transmit interface 700 is controlled by a transmit request ring (TRR) in the node's DRAM memory. In an exemplary embodiment, the TRR can range in size from 512 bytes to 16 MBytes and must be aligned on a TRR size boundary. The TRR is divided into transmit request blocks (TRBs) and each TRB is 128 bytes long. The mesh transmit interface 700 views the TRR as a circular ring of TRBs.

Two registers are used to access the TRR buffer. One contains the address of the current TRB, the other contains the size of the TRR. Software puts message header data into the TRR and increments the request count. The transmit logic sends messages when the request count is non-zero. The transmit logic increments to the next TRB and decrements the request count after each message is sent. The TRR size register is used to know when to roll the address back to the beginning of the TRR buffer. Software uses the TRR size register and the request count register to determine when the TRR is full and when to roll the address to the lowest physical address.

Referring to FIG. 7, the transmit logic has several state machines and control logic needed to examine registers to begin operations, fetch data from memory, and send the message out onto the mesh network. The transmit state machine 701 monitors the MIA control registers and starts the other state machines when there are messages to be sent. A request state machine 703 requests header data when there is a message to be sent and requests data when data is needed for a message. Data path logic 704 is used to route the data from the response queues to MRC interface logic 705. It also injects checksums and tail flit data when selected by a fabric state machine 707. The fabric state machine 707 sends available data to the MRC interface logic 705 when the fabric is ready to receive data.

The transmit logic can be reset by clearing a transmit enable bit in an MIA control register. The transmit logic can be reset at any time (e.g., after any of the transmit errors) by clearing this bit and, then, setting it again.

Referring to FIG. 8, the receive interface 800 allows the node to receive messages from the fabric network. The receive interface 800 has state machines and control logic necessary to receive messages and store data in the node's DRAM memory. A fabric state machine 807 receives messages from the fabric through MRC logic 805. After placing the message header into a temporary header queue 808, a receive state machine 801 is started to analyze the header and begin interfacing with memory. Data path logic 804 is used to combine incoming flits into 64 bit words and store them into a data queue 814. Whenever there is data in the queues to be sent to memory, the request state machine 803 will request data writes to memory, storing the incoming data into the appropriate buffer. After all data has been stored in memory, the receive logic 800 zeros out the next RMB in the mailbox buffer and writes the current RMB, ready for software to process the message.

The receive logic 800 can be reset by clearing the Receive Enable bit in the MIA control register and, then, setting the bit. The receive logic is configured to continue to receive messages from the fabric, even if it is disabled. It discards incoming messages so it will not hang the fabric.

As stated above, the two transmit interfaces and the two receive interfaces are asynchronous, from each other and from the remainder of the logic on the MIA. The two transmit interfaces are clocked from the same MIA clock. Each interface is synchronous with its partner, either a receive or transmit port on the other end. This approach allows flexibility in clocking the MIA mesh interface logic and the devices in the fabric. If the devices at the other end are close by, then all that is needed is to clock both the MIA and the other end with the same clock. If the other end is not so close, then the transmit end can send a clock along with the data that can be used to clock the receiving end logic. If it is even further away, then the logic can send to the other end a ½ clock that can be doubled with a PLL. The transmit side would, then, supply the receive side. For example, two clocks may be sourced at the MIA end and two clocks sourced at the other end.

In loopback mode, the receive clock domain logic normally fed by the sending transmit logic is supplied by the on-chip transmit logic. This allows loopback without any dependencies on outside clocks. For RMC functionality, each channel is completely synchronous with the MIA logic and the other end.

It will be appreciated by those of ordinary skill in the art that the invention can be embodied in other specific forms without departing from the spirit or significant character thereof. The presently disclosed embodiments are, therefore, considered in all respects to be illustrative and not restrictive. The scope of the invention is indicated by the appended claims rather than the foregoing description, and all changes that come within the meaning and range of equivalents thereof are intended to be embraced therein.

I claim:

1. A method of exchanging data between a first agent on an expansion bus and a second agent on a system bus, which comprises:
    providing a bus bridge including a plurality of write gather buffers, the bus bridge bridging the expansion bus and the system bus to maintain coherency with data cached by at least one other agent on the system bus, the bus bridge:
    queuing transaction requests within the bus bridge;
    snooping transactions on the system bus and maintaining a record of pending transaction addresses;
    for write transactions from an agent on the expansion bus, gathering in the write gather buffers data from multiple write transactions pertaining to a cache line;
    if the entire cache line is gathered, issuing an invalidate transaction on the system bus followed by a block write of the cache line; and
    stalling issuance of a queued transaction having a same cache line address as a pending transaction until the pending transaction has been completed.

2. The method according to claim 1, which further comprises, if less than the entire cache line is gathered:

issuing on the system bus a read modify write transaction for the cache line;
merging gather data for the cache line with read data for the cache line; and
writing the entire cache line back to memory.

3. The method according to claim 2, which further comprises, during the read modify write transaction:
detecting a further request for the cache line;
issuing an intervention data response in response to the further request pertaining to the cache line; and
if the entire cache line is gathered, issuing an invalidate transaction on the system bus followed by a block write of the cache line.

4. The method according to claim 1, which further comprises:
bridging the expansion bus, the system bus, and an interconnection mesh with the bus bridge.

5. The method according to claim 2, which further comprises:
bridging the expansion bus, the system bus, and an interconnection mesh with the bus bridge.

6. The method according to claim 3, which further comprises:
bridging the expansion bus, the system bus, and an interconnection mesh with the bus bridge.

7. A bus bridge, comprising:
a first interface for interfacing to an expansion bus;
a second interface for interfacing to a system bus;
queues for queuing transaction requests within the bus bridge;
a cache line;
a plurality of write gather buffers;
means for snooping transactions on the system bus and maintaining a record of pending transaction addresses;
means for gathering in said write gather buffers data from multiple write transactions from an agent on the expansion bus pertaining to said cache line; and
means for issuing an invalidate transaction on the system bus followed by a block write of said cache line if an entirety of said cache line is gathered; and p1 means for stalling issuance of a queued transaction request having a same cache line address as a pending transaction until the transaction has been completed.

8. The bridge according to claim 7, further comprising a means for issuing, if lees than an entirety of said cache line is gathered, on the system bus a read modify write transaction for said cache lines merging gather data for said cache line with read data for said cache line, and writing an entirety of said cache line back to memory.

9. The bridge according to claim 8, further comprising means for detecting a further request for said cache line and for issuing an intervention data response in response to said further request.

* * * * *